S. D. MASTER.
WAVE MOTOR.
APPLICATION FILED DEC. 18, 1920.

1,385,879.

Patented July 26, 1921.
3 SHEETS—SHEET 2.

S. D. Master
INVENTOR

BY Victor J. Evans
ATTORNEY

WITNESS: E. Yeager

S. D. MASTER.
WAVE MOTOR.
APPLICATION FILED DEC. 18, 1920.
1,385,879. Patented July 26, 1921.
3 SHEETS—SHEET 3.
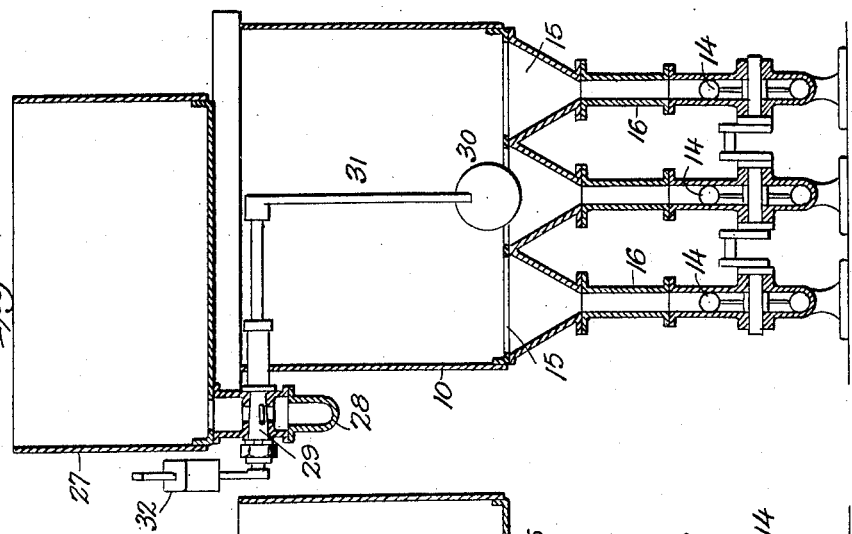
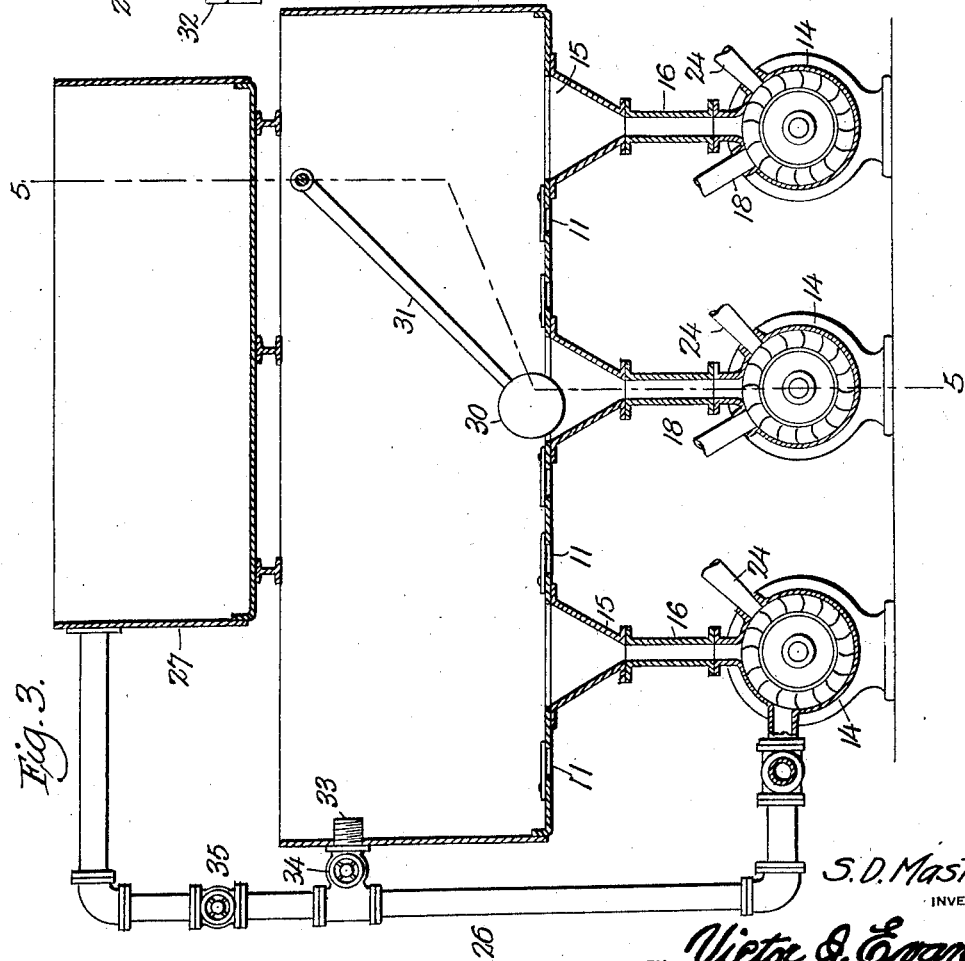
S. D. Master
INVENTOR
BY Victor J. Evans
ATTORNEY
WITNESS:

UNITED STATES PATENT OFFICE.

SHAVERKSHA D. MASTER, OF BOMBAY, INDIA.

WAVE-MOTOR.

1,385,879. Specification of Letters Patent. Patented July 26, 1921.

Application filed December 18, 1920. Serial No. 431,638.

*To all whom it may concern:*

Be it known that I, SHAVERKSHA DORABJI MASTER, a subject of the King of Great Britain, residing at Frere Road, in the city of Bombay and country of India, have invented new and useful Improvements in Wave-Motors, of which the following is a specification.

This invention relates to a wave motor or the like and embodies among other features a main supply tank from which water is conveyed to spaced rows of turbines or the like, which operate to drive machinery of any character, and also operates to force the exhaust water passing from the turbines into an auxiliary or reserve tank which has a valve communicating with the turbines, for the purpose of maintaining the turbines or the like operating at a more or less uniform speed.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views and wherein:

Fig. 3 is a vertical longitudinal sectional view.

Fig. 5 is a sectional view taken on line 5—5 of Fig. 3.

Figure 1:
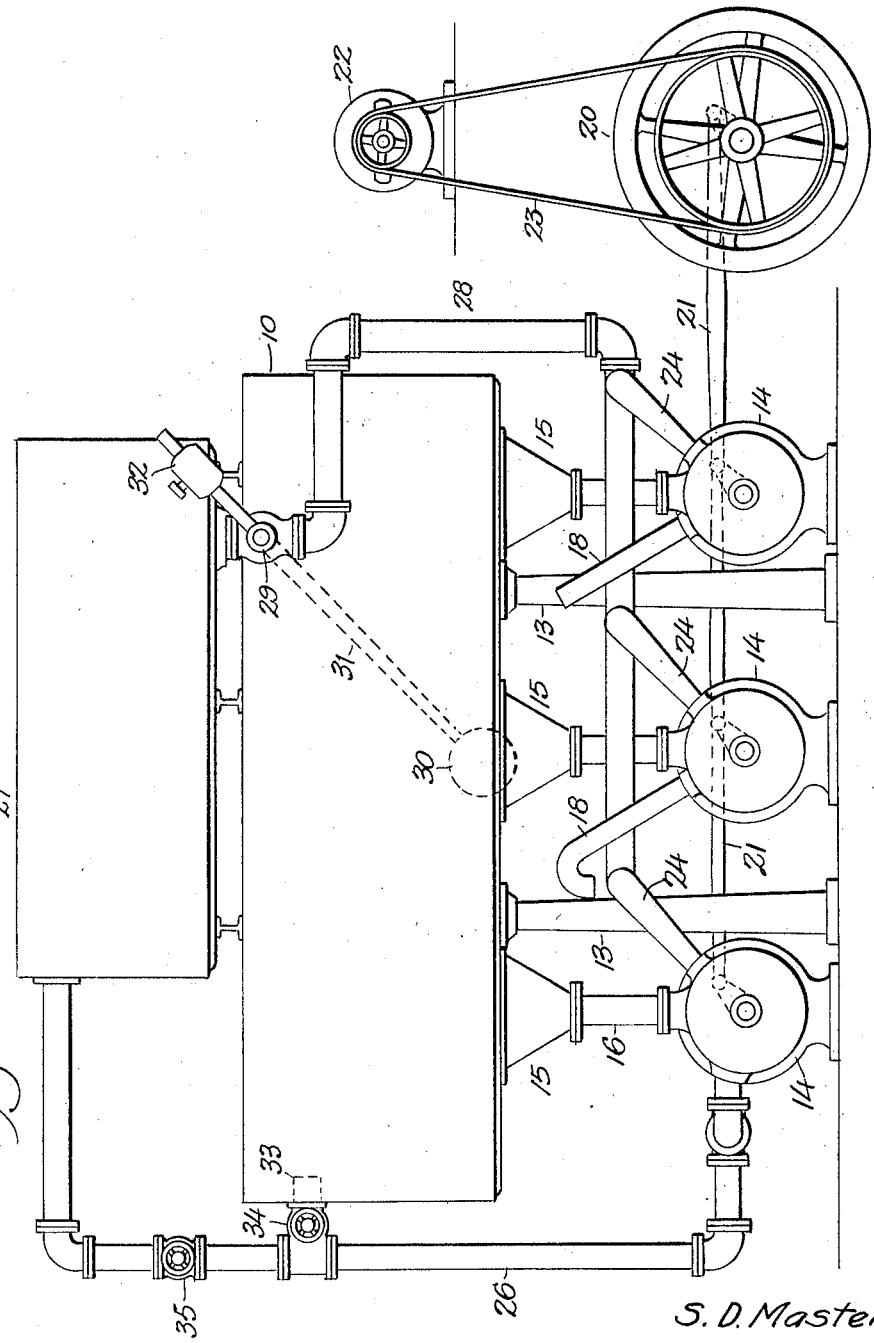
Figure 1 is a side elevation of the apparatus forming the subject matter of my invention.
Figure 2:
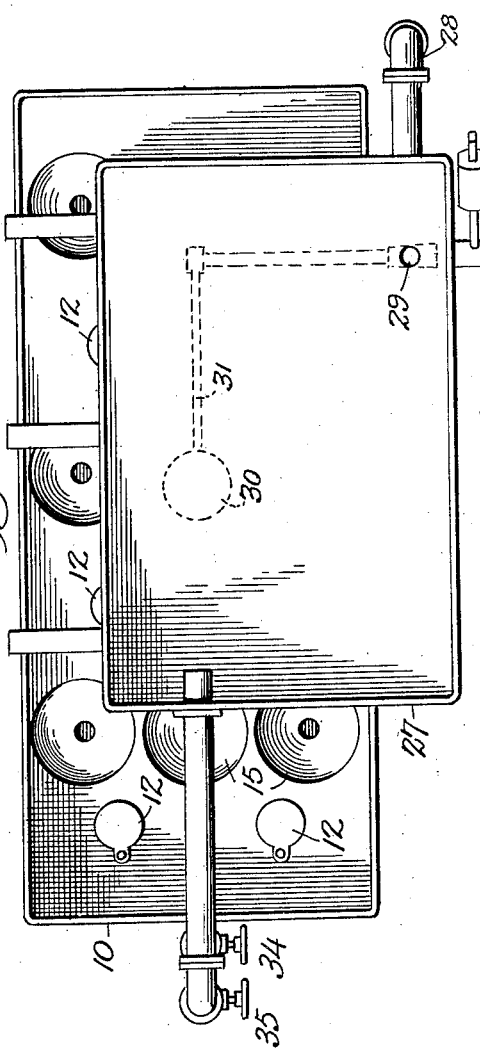
Fig. 2 is a top plan view.
Figure 4:
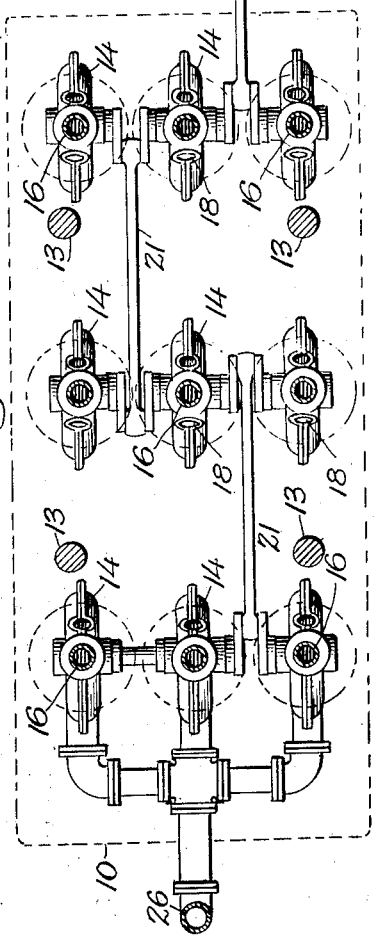
Fig. 4 is a horizontal sectional view.

The apparatus forming the subject matter of my invention embodies what I term a main water supply tank 10 which is provided with water inlets 11 in the bottom and sides thereof, and which inlet openings are equipped with inwardly opening flap valves 12. This tank is supported at an appropriate distance above the water level by means of pillars or uprights 13, so that when the waves rise, water is admitted to the tank 10 through the valve controlled inlets, these valves closing under the pressure of the water within the tank subsequent to the falling of the waves. Arranged beneath the tank 10 are spaced parallel rows of turbines or the like 14 which communicate with the tank 10 through enlarged openings 15 in the bottom thereof, pipes 16 being interposed between the openings 15 and the turbines, and which pipes have conical shaped extremities as shown. Relatively short pipes coming down from the extremities 18 constitute exhaust pipes for the turbines as shown. The ends of these pipes are preferably disposed beneath the water level or near the latter so as to prevent back pressure. The turbines are connected to a fly wheel 20 through parallel connecting rods 21, while the fly wheel is connected to a dynamo or other suitable power apparatus 22 by means of a belt 23. The water enters the turbines from the tank 10 passes from one row to the other through pipes 24. The water is finally pumped from the last row of turbines through pipes 26 which pass through the tank 10 and communicates at one end with an auxiliary or reserve tank 27 which is supported at a suitable distance above the tank 10. The reserve tank communicates with the opposite end row of turbines through a pipe 28, while the communication between the tank 27 and the latter mentioned row of turbines is controlled by means of a valve 29. This valve is automatically operated by means of a float 30 carried by a rod 31 with which the valve is associated, the rods being further equipped with a balance weight 32. Projecting from the pipe 26 into the main supply tank 10 is an outlet pipe 33 which establishes communication between the pipe 26 and said tank, this communication being controlled by a valve 34; arranged within the pipe 26 is a valve 35 which controls communication with the final rows of turbines through the auxiliary tank 27. The valves 34 and 35 are alternately opened and closed for a purpose to be presently described.

In practice, when the level of the water rises, water enters the main supply tank 10 through the inlet openings 11 as above described, the valves 12 opening to admit water to enter the tank 10, and closing to prevent the escape of water through the openings 11 subsequent to the fall of the water level. The water remaining in the tank 10 in this manner causes the float 30 to rise within the tank, with the result that the valve 29 is closed thereby cutting off communication between the auxiliary tank 27 and the turbines. The water flows from the tank 10 through the pipes 16 to the turbines, operating the latter and the fly wheel 10 for the purpose mentioned. The water passes from one row of turbines to the other until it is finally pumped by one row of turbines through the pipe 26 into the auxiliary or reserve tank 27. For this purpose the valve 35 must of course be opened, and when this valve is opened the valve 34 is closed. It is of course understood that as the water flows from the tank 10 the water within the tank is thereby lowered, the float 30 is correspondingly lowered with the result that the valve 29 is opened. In view of this fact, the speed with which the turbines are operated is not severely effected by the varying degrees of pressure within the tank 10, as the valve 29 automatically opens when the water level within the tank 10 is lowered, thereby admitting water from the reserve tank 27 to pass through the pipe 28 into the turbine, with a view of maintaining the turbines operating at a more or less constant speed. When the auxiliary or reserve tank 27 becomes full, the valve 35 may be closed and the valve 34 opened to admit water to the tank 10, or this operation may be reversed so that after the tank 10 is filled, the valve 34 may be closed and the valve 35 opened to store water in the auxiliary tank 27. The operation of the valves 34 and 35 may be automatic if desired and floats used within the tank 10 to control their operation.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim is:

1. A wave motor comprising a main water supply tank, valve controlled water inlets therefor, spaced parallel rows of turbines communicating with said tank and with each other, parallel reciprocating rods connecting said turbines, an auxiliary tank, pipes for conveying water from one row of turbines to said auxiliary tank, valve controlling said communication, and valve controlled means for conveying water from the auxiliary tank to the adjacent row of said turbines.

2. A wave motor comprising a main water supply tank, valve controlled water inlets therefor, spaced parallel rows of turbines communicating with said tank and with each other, exhaust pipes leading from said turbines, reciprocating rods connecting said turbines, an auxiliary water tank, pipes for conveying water from one row of the turbines to said auxiliary tank, a valve controlling communication, said pipes including branches connecting the main supply tank, and a valve controlling communication between the pipe and said tank, through said branches, and valve controlled means for conveying water from the auxiliary tank to the adjacent rows of said turbines.

3. A wave motor comprising a main water supply tank, valve controlled water inlets therefor, spaced parallel rows of turbines communicating with said tank and with each other, parallel reciprocating rods connecting said turbines, an auxiliary tank, pipes for conveying water from one row of said turbines to said auxiliary tanks, a valve for controlling said communication, pipes conveying water from the auxiliary tank to another row of said turbines, valves controlling said communication, and floats operating in said supply tank for actuating said latter mentioned valves.

In testimony whereof I affix my signature.

SHAVERKSHA D. MASTER.